Patented Nov. 29, 1938

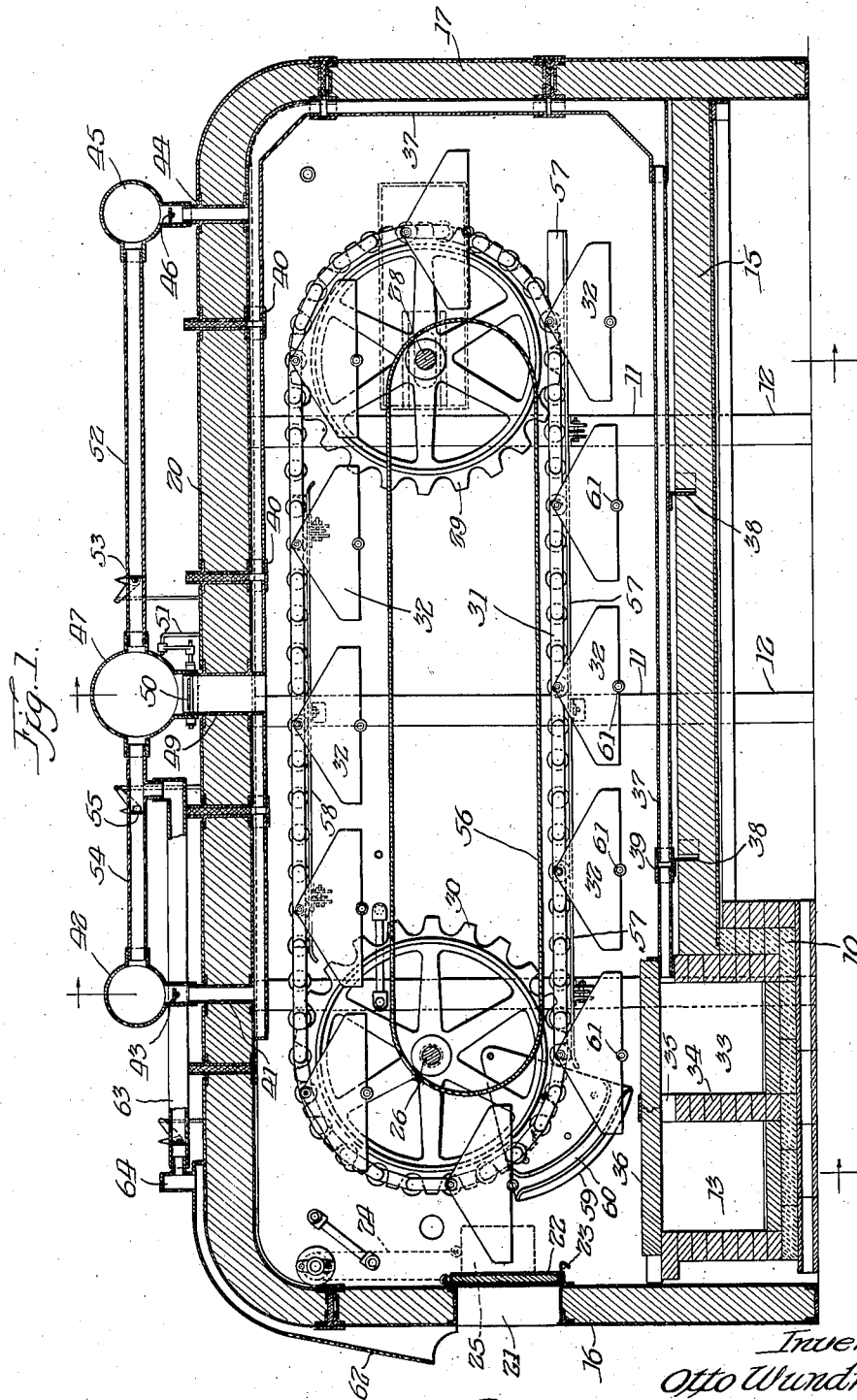

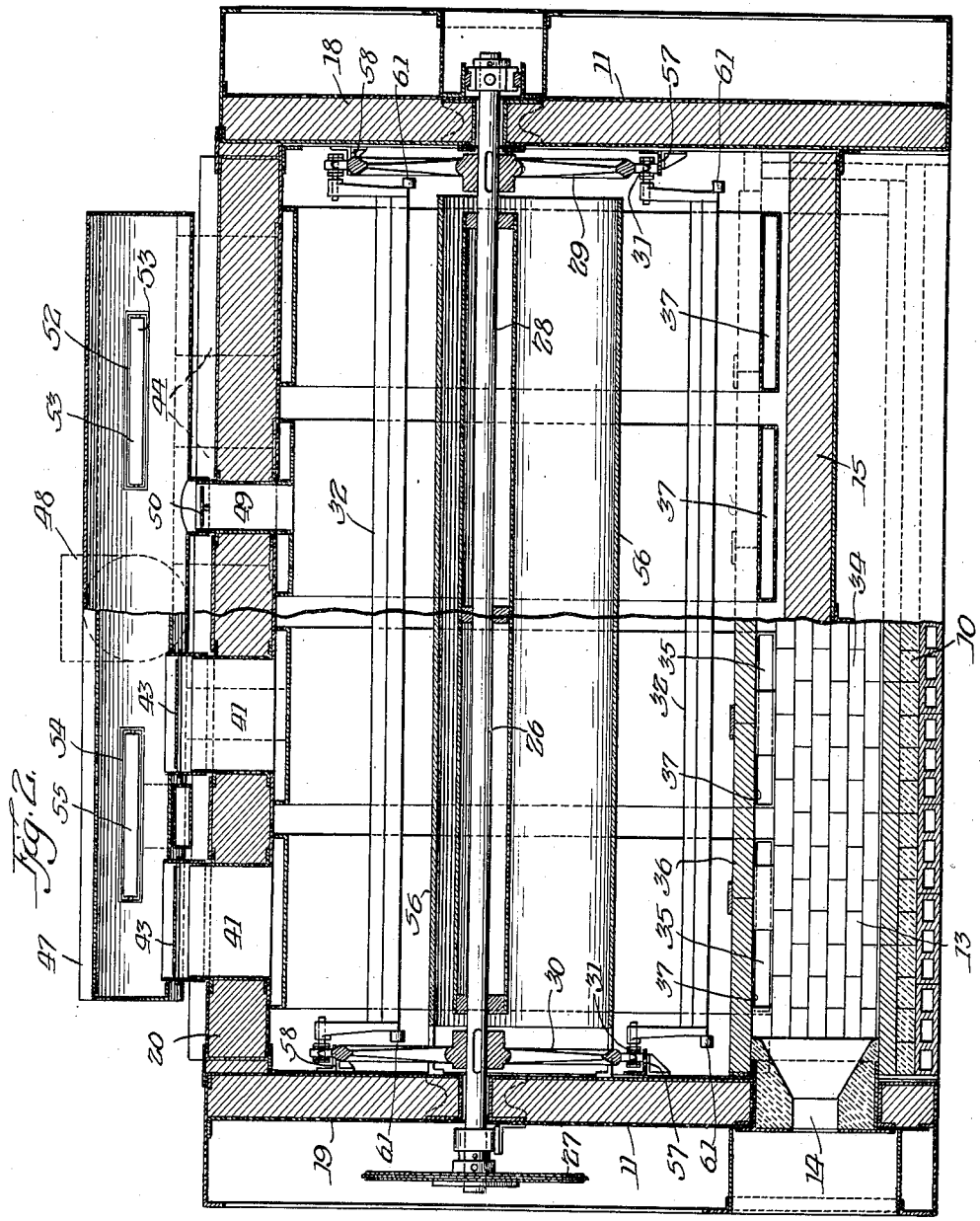

2,138,465

UNITED STATES PATENT OFFICE 2,138,465

OVEN CONSTRUCTION

Otto Wundrack, Chicago, Ill.

Application May 1, 1937, Serial No. 140,121

4 Claims. (Cl. 107—63)

My invention relates to bakers' ovens and has particular reference to an oven having movable trays therein, and which provides means for controlling the temperature of the oven in the manner most desired throughout the baking operation, and in which an even temperature in the baking chamber can be secured or, if desired, a portion of the baking chamber can be heated at a higher temperature than another portion, depending upon the wish of the operator.

Another and further object of my invention is the provision of a baking oven in which heat conduits from the furnace are provided which circulate the heated gases from the combustion chamber throughout the inner walls of the baking chamber and in this manner a smaller quantity of fuel would be required than if the heated gases were applied through the furnace walls or externally thereof, as is the practice now.

Another and further object of my invention is the provision of conduits which extend substantially around the baking chamber on the inner side thereof, and which have spaced outlets by means of which the heated gases can be drawn out of these conduits before they pass through the entire length of conduit if desired, thus having the effect of reducing or retaining the temperature of the oven to the desired degree during the baking operation.

These and other objects of my invention will be more fully and better understood by reference to the accompanying sheets of drawings, and in which—

Figure 1 is a longitudinal sectional view through an oven of my improved construction; and Figure 2 is a transverse sectional view taken on two planes through the view shown in Figure 1 of the drawings.

Referring now specifically to the drawings, and in which like reference characters refer to like parts throughout, an oven is shown having the usual foundation 10, and side support members 11, 11 which have leg portions 12, 12 extending down somewhat below the floor of the oven to rest upon a floor or other suitable support member for the oven as a whole. A combustion chamber 13 is provided which rests upon the foundation 10, with a suitable fuel inlet 14 through which suitable fuel, such as oil or gas, is supplied to the combustion chamber 13. A bottom 15 is provided for the oven, a front end 16, a rear end 17, side walls 18 and 19, and a top 20, the bottom, sides and end walls and the top being constructed in the usual manner of ovens of this type. A shell is provided made up of plates and then filled with some kind of refractory material, whereby a complete enclosure is provided within which the baking takes place.

In the front wall 16 is provided a door opening 21 adapted to be closed by a door 22 which moves up and down in suitable guides on the inside of the oven and is supported upon a shelf-like member 23 which extends into the oven and forms a plate upon which the bread pans can rest as they are placed into and removed from the oven. A cable 24 is provided, one end of which is secured to the door 22, and a counterweight 25 is mounted on one end of the cable, the other end of which is secured to the door, with means extending externally of the oven by means of which the door is raised and lowered, thereby opening and closing the door opening 21.

Extending transversely of the oven near the front end thereof is a shaft 26 which extends through the side walls 18 and 19 of the oven, and is mounted in suitable bearings in these side walls, with a driving wheel 27 on the outer end thereof to which a belt or other suitable driving means is attached leading to an electric motor by means of which the shaft can be rotated. At the rear of the oven a second transversely extending shaft 28 is mounted, which is journalled in the side walls 18 and 19 of the oven in much the same manner as the shaft 26, and provides means by which sprocket wheels, such as 29, are supported at the rear end of the oven, with other sprocket wheels such as 30, being mounted at the front of the oven. A pair of endless chains 31, 31 is provided at each side of the oven upon which are mounted trays 32, 32 which support the bread pans used during the baking operation, and which move throughout the interior of the oven in a longitudinal direction as the shaft 26 is rotated through means of the power mechanism connected to the wheel 27 heretofore described. This construction in general is the type of oven construction which is now in common and general use.

Adjacent the combustion chamber 13 is provided an equalizing chamber 33 which is separated from the combustion chamber by a vertical wall 34, and which has a plurality of ports 35 connecting with the combustion chamber so that the combustion chamber 13 and equalizing chamber 33 are connected by means of the ports 35, through which the flames, heated gases and products of combustion may pass during the heating operation of the oven. A suitable top 36 of refractory material is provided over the combustion chamber 13 and equalizing chamber 33 so that both the combustion chamber and the heating chamber are separate from the body of the oven within which the baking operation takes place.

Leading from the equalizing chamber 33, I provide a plurality of conduits 37 which extend along the bottom of the oven and are supported by angles 38, 38 embedded in the bottom of the oven, with expansion members 39 being provided to allow for contraction and expansion of the members 37 during their use. These members extend in a vertical direction along the rear end wall 17 upward to the roof 20 and forward on the under side of the roof 20, being supported against the roof 20 in any suitable manner, as by brackets 40, 40, and terminate near the forward end of the oven. Outlets 41 are connected thereto which pass through the roof 20 of the oven to a transversely extending header 42 mounted above the roof of the oven and extending transversely thereacross. Dampers 43, 43 are provided in the outlet pipe 41 which have operating means connected therewith outside of the conduits 41, by means of which the dampers 43 can be opened or closed, as may be desired, to allow the heated gases, products of combustion and the like to pass through the outlets 41 and into the header 42.

Near the rear end 17 of the oven I provide a plurality of conduits 44, 44 which extend through the roof 20 and are connected to the conduits 37, 37, and which lead to a transversely extending header 45. Dampers 46, 46 are provided in the conduits 44 and through which the gases, products of combustion, and the like may pass when the dampers 46 are opened.

A transverse header 47 centrally mounted of the oven is provided, one end of which is connected to an outlet chimney 48, this header having a plurality of outlets 49 leading from the body of the oven to the header 47, through which the heated gases and the like from the body of the oven pass, these passages being controlled by dampers 50, 50 mounted in the passages 49 and under the control of the operator by means of operating arms 51, so that if desired the heated gases, steam, and the like, can be quickly drawn from the body of the oven and the temperature of the body of the oven materially reduced. It will be understood that the chimney 48 leads either to a stack or to some outlet means in which a suction fan may be mounted, if desired, and which provides means for rapidly drawing off the heated air, gases and products of combustion from the oven during the baking operation. Connecting the header 45 and header 47 is a conduit 52, within which dampers 53 are located, and which serves to conduct the heated gases and products of combustion from the outlets 44 and header 45 into the header 47 connected to the outlet stack 48. The dampers 53 and 46 control the flow of gases, products of combustion and the like, through these conduits.

A similar conduit 54 is provided which leads from the header 42 to the header 47, with a damper 55 being mounted therein. The conduit 54 provides means for the flow of gases through the outlets 41 into the header 42 when it is desired to have the heated gases pass throughout the entire length of the conduits 37, the dampers 46 in the outlet conduits 44 being closed at this time so that the oven is more quickly heated or maintained at a higher temperature operation when the gases are allowed to pass throughout the full length of the conduits 37. A baffle 56 is provided which is secured at its side edges to the inner wall of the baking oven, and in effect provides a channel between the bottom of the oven and the top thereof through which the trays 32 pass. In effect it serves to confine the heated gases to this area and assists in the baking operation.

The chains 31 are mounted to pass over tracks 57 in the lower part of the oven, with similar tracks 58, 58 being provided near the top of the oven to hold the chains in alignment and prevent their sagging and preventing the proper operation of the trays throughout the oven. Guides 59 are also provided near the front of the oven, the guide 59 having channels 60 therein which are to receive rollers 61, 61 on the lower portion of the trays and in effect stabilize the trays during the loading and unloading thereof when articles to be baked are placed in the oven or removed therefrom.

A hood 62 extends outward over the entrance 21 of the oven, and is adapted to receive the heated gas, steam and the like, issuing from the opening 21 when the door 22 is opened, this hood 62 extending across the front end of the oven, and having a conduit 63 leading from a connection 64 into the conduit 54 through which the steam, gases and the like, escaping from the door are carried away through the chimney.

In operation of the oven, it will be understood that the oven is heated by means of combustion of fuel, such as oil, gas or the like, in the combustion chamber 13. The flames pass against the division wall 34, with the heated gases therefrom and products of combustion passing into the equalizing chamber 33 where they are distributed and then passed outward into the conduits 37. During the initial heating stages, the heated gases pass along the bottom of the oven in a vertical direction at the end 17 and follow the conduits 37 toward the forward end of the oven, the dampers 46 and 53 being closed, and pass outward through the conduits 41 into the header 42 and through the conduit 54 back to the header 47 and out to the chimney or stack 48. The gases are allowed to pass in this manner until the oven is heated to a proper degree and also during the baking operation.

Thereafter, when it is desired to more effectively control the temperature or lower the temperature of the oven, the dampers 43 and 55 are closed and the dampers 46 and 53 opened, in which case the heated gases do not travel across the top of the oven but pass outward through the outlet conduits 44, header 45 and horizontal conduit 52, into the header 47 and then discharge into the stack 48. To provide additional means for cooling the oven, the outlet 49 is provided which leads directly to the header 47, although I do not contemplate that it will be necessary to use this outlet except for the removal of objectional gases from the body of the oven. However, it can be used for the purpose of reducing the temperature of the gases inside the oven if desired.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A baker's oven comprising, in combination, a bottom, side and end walls and a top portion, a combustion chamber and conduits leading therefrom along the bottom of the oven, upward at one end thereof and along the top of the oven, a plurality of spaced outlets from said conduits extending through the top of the oven, and an intermediate outlet leading from the upper portion of the oven chamber.

2. In combination with a baker's oven, a combustion chamber therein, an equalizing chamber adjacent thereto and in communication therewith, a plurality of conduits leading from the equalizing chamber along the bottom, one end wall and the top of the oven, a pair of headers external of the oven at the top thereof, in spaced relation with each other, outlets from the said conduits to the headers, dampers in said outlets, and outlets from the said headers to a chimney.

3. In combination with a baker's oven, a combustion chamber therein, an equalizing chamber adjacent thereto and in communication therewith, a plurality of conduits leading from the equalizing chamber along the bottom, one end wall and the top of the oven, headers at each end of the oven external thereof, outlets from said conduits to the said headers, dampers in said outlets, a second header centrally located with respect to the oven, and outlets from the said first mentioned headers to the said central header.

4. An oven comprising top, bottom, side and end walls, a combustion chamber, heating conduits of substantially greater width than depth leading from said combustion chamber rearward to the rear end of the said oven inside of the bottom wall of said oven, thence upward on the inside of the rear end wall, and forward on the under side of the top wall, the conduits having outlets through the top wall of the oven and covering substantially the entire surface of the adjacent walls throughout the length of the said conduits, outlet passages connecting the outlets, and an intermediate outlet from the oven chamber connected to said outlet passages.

OTTO WUNDRACK.